(12) United States Patent
Oza et al.

(10) Patent No.: US 11,616,566 B2
(45) Date of Patent: Mar. 28, 2023

(54) SATELLITE BEAM SELECTION

(71) Applicant: Hughes Network Systems, LLC, Germantown, MD (US)

(72) Inventors: Rajeev Gautam Oza, Boyds, MD (US); Suresh Kumar Korada, Boyds, MD (US); Guy Montgomery, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 26 days.

(21) Appl. No.: 17/137,877

(22) Filed: Dec. 30, 2020

(65) Prior Publication Data

US 2022/0209856 A1 Jun. 30, 2022

(51) Int. Cl.
*H04B 7/185* (2006.01)
*H04B 7/06* (2006.01)
*H04B 7/08* (2006.01)
*H04H 40/90* (2008.01)
*G01S 19/42* (2010.01)

(52) U.S. Cl.
CPC ....... *H04B 7/18523* (2013.01); *H04B 7/0695* (2013.01); *H04B 7/088* (2013.01); *H04H 40/90* (2013.01); *G01S 19/42* (2013.01)

(58) Field of Classification Search
CPC ... H04B 7/0695; H04B 7/088; H04B 7/18523
See application file for complete search history.

(56) References Cited

U.S. PATENT DOCUMENTS

2019/0207672 A1* 7/2019 Arora ................ H04W 4/02

FOREIGN PATENT DOCUMENTS

| CA | 22700 A1 | * 11/1885 | |
|---|---|---|---|
| EP | 0920142 A1 | * 6/1999 | |
| EP | 1134914 A2 | 9/2001 | |
| WO | WO-2008115949 A2 | * 9/2008 | ........... H04B 7/2041 |
| WO | WO-2018160842 A1 | * 9/2018 | ........... H04B 17/309 |

* cited by examiner

*Primary Examiner* — Keith Ferguson
(74) *Attorney, Agent, or Firm* — Bejin Bieneman PLC

(57) ABSTRACT

A system includes a remote computer. The remote computer includes a processor and a memory. The memory stores instructions executable by the processor to receive location data of a plurality of satellite terminals, select, based on the received location data, for each of the plurality of satellite terminals, a respective satellite beam for providing satellite communications, and broadcast a message to the plurality of satellite terminals including data specifying respective selected satellite beams for each of the plurality of satellite terminals.

21 Claims, 6 Drawing Sheets

Legend
Beam transmission region boundary — — —
Beam footprint boundary  ----------
Coverage area  — · — · —

Legend

Beam transmission region boundary  — — — — —

Beam footprint boundary  - - - - - - - - - - -

Coverage area  — - — - — - —

SATELLITE BEAM SELECTION

BACKGROUND

Satellite communications can provide wireless communications over a large area of the Earth's surface, e.g., for Internet access, enterprise intranet connectivity, TV (television) broadcasting services, etc. Coverage areas of satellites on the Earth's surface may overlap. For example, as a satellite terminal moves, the satellite terminal may switch between different satellites and/or satellite beams.

DETAILED DESCRIPTION

Introduction

Figure 1:
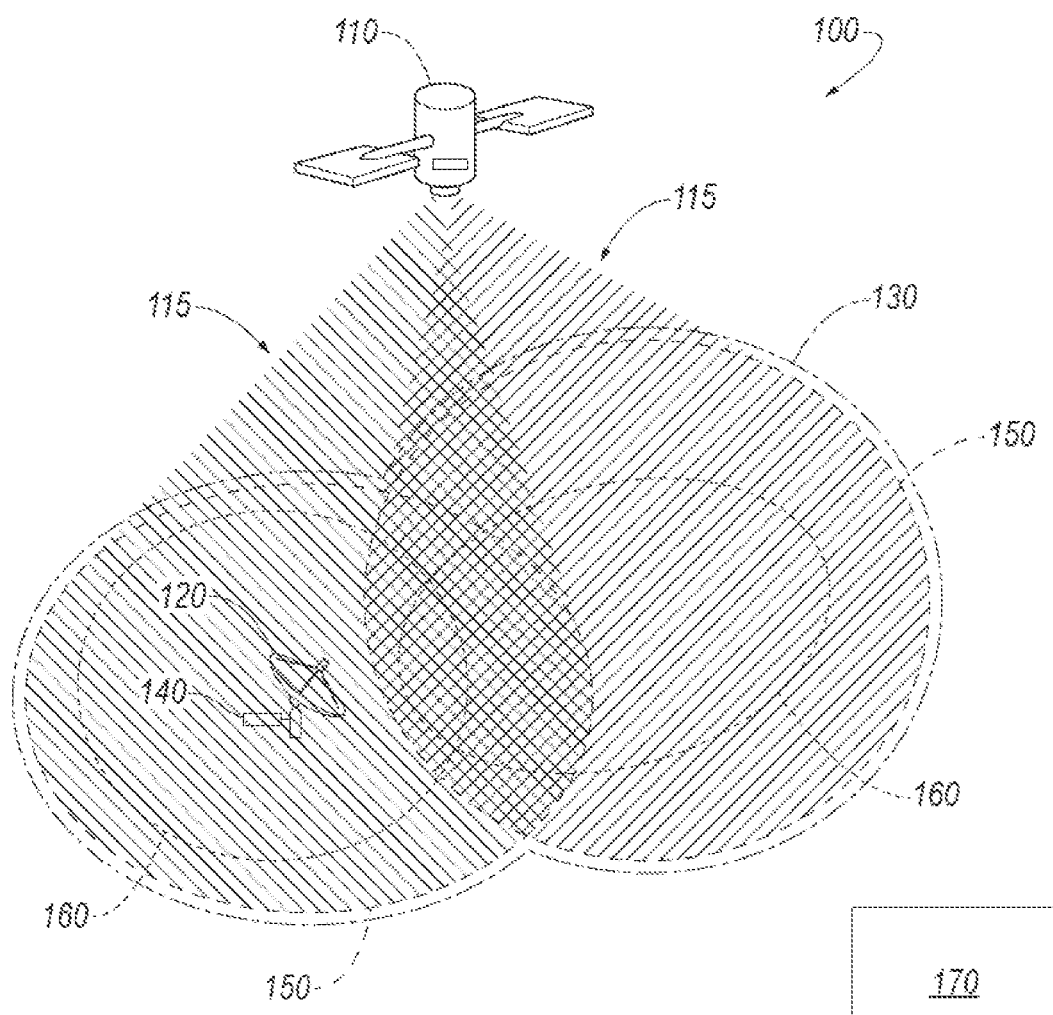
FIG. 1 illustrates an example satellite network.
Figure 1:
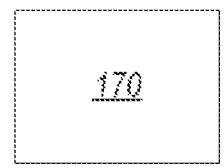
Figure 1:
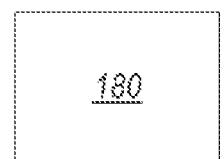
Figure 1:
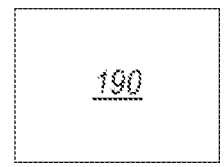

Disclosed herein is a system comprising a remote computer including a processor and a memory. The memory stores instructions executable by the processor to receive location data of a plurality of satellite terminals, select, based on the received location data, for each of the plurality of satellite terminals, a respective satellite beam for providing satellite communications, and broadcast a message to the plurality of satellite terminals including data specifying respective selected satellite beams for each of the plurality of satellite terminals.

The instructions may further include instructions to select the respective satellite beams from one or more stored beam plans, wherein each of the one or more stored beam plans specifies a respective set of footprint boundaries for one or more satellite beams.

Each of the footprint boundaries may be a subset of a transmission region of a satellite antenna.

The one or more stored beam plans may further specify a rating for each beam, wherein the instructions further include instructions to select the respective satellite beam based at least in part on the rating of the respective satellite beam.

The instructions may further include instructions to broadcast the message via a satellite beam upon determining, based on the received location data, that each of the plurality of satellite terminals communicate via the satellite beam.

The received location data may further include a satellite beam identifier specifying current satellite beams through which respective satellite terminals communicate, and the instructions further include instructions to determine, based on the current satellite beams, that each of the plurality of satellite terminals communicate via the satellite beam.

The received location data for a terminal may further include a satellite beam identifier specifying at least one of a speed and a direction of movement of the selected terminal, and the instructions further include instructions to select the satellite beam for the terminal based at least in part on a speed, direction of movement of the satellite terminal, or requested data load of the terminal.

The instructions may further include instructions to broadcast the message via a first satellite beam and a second satellite beam upon determining, based on the received location data, that a first subset of the plurality of satellite terminals communicate via the first satellite beam and a second subset of the plurality of satellite terminals communicate via the second satellite beam.

The instructions may further include instructions to broadcast the message via each of a plurality of channels of the selected beam.

The instructions may further include instructions to broadcast the message via a subset of that is less than all of a plurality of channels of the selected beam, wherein the subset of the plurality of channels is selected based on respective channel of communication of each of the plurality of terminals.

The message may include (i) terminal identifiers of the plurality of satellite terminals, and (ii) one or more satellite beam identifiers.

The instructions may further include instructions to transmit, to a second remote computer, identifiers of the satellite terminals and the selected respective satellite beams identifiers, and upon receiving data from the second remote computer including at least one of a confirmation of the transmitted identifiers or new proposed satellite beams, broadcast the message to the satellite terminals based on the received data.

The instructions may further include instructions to transmit, to the second computer, a speed, direction, elevation, current loading of beams, current data load of the terminals.

The system may further include a satellite terminal computer, programmed to upon receiving receive the broadcast message, based on message data, determine whether an instruction for the satellite terminal is included in the message, and upon determining that the instruction for the satellite terminal is included in the message, then switch the satellite terminal based on one or more beam identifiers included in the received message data.

The satellite terminal computer may be further programmed to maintain a current satellite beam through which the satellite terminal communicates upon determining that an identifier of the current satellite beam is included in the received one or more beam identifiers.

The satellite terminal computer may be further programmed to switch from a current satellite beam through which the satellite terminal communicates to one of the one or more beam identifiers included in the received message data upon determining that the received one or more beam identifiers lacks an identifier of the current satellite beam.

The satellite terminal computer may be further programed to select one of the one or more beam identifiers based on a load of the one or more satellite beams.

Further disclosed is a computing device programmed to execute any of the above method steps.

Yet further disclosed is a computer program product comprising a computer-readable medium storing instructions executable by a computer processor, to execute any of the above method steps.

EXEMPLARY SYSTEM ELEMENTS

In a satellite communication system that has mobile satellite terminals, the satellite terminals typically switch from one satellite beam to another satellite beam. As a satellite terminal located in a vehicle, airplane, etc., moves, the satellite terminal typically will (i) switch from one beam of a satellite to another beam of the same satellite, and/or (ii) switch from a beam of a satellite to a beam of another satellite. Further, for a non-moving (i.e., immobile) satellite terminal, e.g., in homes, offices, etc., satellites can select a beam when the satellite terminal is installed, e.g., when the satellite terminal is located in an area covered with multiple satellite beams.

As disclosed herein, a remote computer can be programmed to receive location data from a plurality of satellite terminals, and to select, based on the received location data, for each of the satellite terminals, a respective satellite beam for providing satellite communications. The computer can be programmed to broadcast a message to the satellite terminals including data specifying respective selected satellite beams for each of the satellite terminals.

With reference to FIG. 1, a satellite network 100 may include one or more satellites 110 providing satellite communication to terminals 120 located in a coverage area 130 of the satellite communication network 100, and to remote computers 170, 180. A coverage area 130 of a satellite communication network 100 includes a geographical area on the surface of Earth. A coverage area 130 of a satellite communication network 100 may include transmission regions 150 of one or more beams 115 of one or more satellites 110 included in the satellite communication network 100. Locations on the surface of Earth, e.g., a location of a satellite terminal 120, may be specified based on a location coordinate system, e.g., a planar coordinate system including longitudinal and latitudinal coordinates. Additionally or alternatively, a location on the surface of Earth may be specified based on a celestial coordinate system including an azimuth and an elevation (or altitude).

Satellite 110 may include a computer 140 and an antenna communicating with terminals 120 via a satellite communication link. In the present context, a satellite link (or satellite communication link) may include an uplink, including communication from a terminal 120 or a satellite gateway 190 to a satellite 110 and a downlink, which includes communication from the satellite 110 to the gateway 190 or a terminal 120.

A satellite 110 antenna may communicate via one or more satellite beams 115 having respective beam transmission regions 150. In the present context, a beam transmission region 150 is a geographical area on the surface of Earth, in which a terminal 120 may communicate with the satellite 110. A satellite 110 beam 115 having a transmission region 150 is a satellite 110 signal that is concentrated in power, sent by a high-gain antenna, and that therefore typically covers only a limited geographic area on Earth. A satellite 110 may have any number (one or more) of beams 115 that cover different parts of satellite network coverage area 130. Satellite 110 beams 115 may overlap. A satellite transmission region 150, i.e., including its dimensions and shape, is determined by a satellite 110 distance from the Earth and physical characteristics of the satellite 110 antenna such as antenna radiation pattern, etc. A terminal 120 in a beam transmission region 150 may receive data from the satellite 110 via a downlink or send data to the satellite 110 via an uplink. A satellite 110 may provide coverage for multiple terminals 120, e.g., in multiple geographical regions within the beam transmission region 150. A satellite beam transmission region 150 may have a circular shape or a non-circular shape, e.g., elliptical, polygon, etc. A shape of a transmission region 150 is defined based on physical characteristics of satellite 110 antenna, e.g., radiation pattern, a frequency of communication, a distance of the satellite 110 from the Earth, etc.

A satellite beam footprint 160 herein means a geographical area within (or possibly coterminous with) a transmission region 150 of a satellite 110 that is defined based on stored location coordinates of locations on a perimeter of the footprint 160. Thus, a footprint 160 is an area that is typically a subset of, i.e., less than all, of a transmission region 150. While dimensions and/or a shape of a transmission region 150 are defined by physical characteristics of the satellite 110 antenna, etc., as discussed above, the dimensions and a shape of a footprint 160 are defined based on stored location coordinates of the perimeter of the footprint 160. Thus, a footprint 160 within a transmission region 150 may be smaller and have any suitable shape. For example, a footprint 160 with a triangular shape may be defined within a circular shaped transmission region 150. The footprint 160 shape and/or dimensions may be changed by adjusting location coordinates of the perimeter of the footprint 160, whereas a transmission region 150 shape and/or dimensions can be changed by changing physical characteristics such as a satellite 110 antenna radiation pattern, communication frequency, etc. In other words, by defining footprints 160 using stored location coordinates of a perimeter of the footprint 160, the footprints 160 can be adjusted in shape, dimensions, and/or location by changing the stored data. As discussed below, based on the footprints 160, the CBS computer 170 determines which beam to be used for communication by a terminal 120. Thus, flexibility of redrawing boundaries of footprints 160 provides flexibility of adjusting how the beams 115 for terminals 120 are selected. The boundaries of a footprint 160 may be defined by operator manually or using a suitable computer tool and then entered to the CBS computer 170. An operator may select the boundaries of a footprint 160 based on various constraints, e.g., limiting the footprint 160 to be within an acceptable transmission region 150 of a respective satellite 110.

A satellite 110 beam 115 provides for communications via multiple channels, e.g., CDMA (code division multiple access) channels, TDMA (time division multiple access) channels. Several terminals 120 can communicate via a channel of the beam 115. In one example, a satellite 110 beam 115 may have 50 channels. Satellite 110 beams 115 channels may be individually addressable. Thus, a satellite 110 may send first data via a first channel and send second data via a second channel.

A satellite 110 can provide a broadcast transmission, i.e., can transmit a signal including data via one or more beams 115 via one or more channels. In one example, a satellite 110 may broadcast first data via each of the channels of a first beam 115. In another example, a satellite 110 may broadcast data via a first selected set of channels of a first beam 115 and a second selected set of channels of a second beam 115. In yet another example, a satellite 110 beam 115 may include a specified channel dedicated to broadcasting data. Thus, satellite 110 may broadcast data via the dedicated broadcast channel.

A remote computer 170, 180, a satellite 110 computer 140, or a terminal 120 computer 140, is a computing device including a processor and memory. Computer memory can be implemented via circuits, chips or other electronic components and can include one or more of read-only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store instructions executable by the processor and other data. The processor is implemented via circuits, chips, or other electronic component and may include one or more microcontrollers, one or more field-programmable gate arrays (FPGAs), one or more application specific integrated circuits (ASICs), one or more digital signal processors (DSPs), one or more customer-specific integrated circuits, etc. A processor in computer 140, 170, 180 may be programmed to execute instructions stored in a computer memory to carry out the actions, as disclosed herein.

The remote computer 170 can be referred to as a Central Beam Selector (CBS). As discussed below, the CBS computer 170 sends, e.g. broadcasts, messages to a plurality of satellite terminals 120 including data specifying respective selected satellite beams 115 for respective satellite terminals 120. The remote computer 180 can be referred to as an External Beam Selector (EBS). As discussed below, the EBS computer 180 sends data to the CBS computer 170 including a confirmation of the beams selected by the CBS computer 170, or proposes new satellite beams 115.

The terminals 120 (or satellite terminal 120), e.g., very small aperture terminals (VSAT), are computer-based communication devices implemented via circuits, chips, antennas, or other electronic components that can communicate with satellites 110 that are within communication range of the terminal 120. A terminals 120 can be stationary relative to a location on Earth, or can be mobile, i.e., moving relative to a location on the Earth. In some instances, the terminal 120 may provide an interface between a satellite 110 and other ground-based communication devices. For instance, the terminal 120 may receive communications from a satellite 110 and transmit such communications via terrestrial communication channels (i.e., between ground-based devices).

A terminal 120 includes one or more computers 140. A terminal 120 may include a modulator and a demodulator to facilitate communications with satellites 110. Moreover, a terminal 120 may have an encoder to encode outgoing data and/or a decoder to decode received data. A terminal 120 may include or be communicatively connected to one or more antennas, which allow a terminal 120 to communicate with one or more satellites 110 at a time. For example, a dish antenna may include a low-noise block downconverter (LNB) mounted on the dish, which may collect radio waves from the dish and convert the collected radio waves to a signal which is sent through a wired connection, e.g., a cable, to the terminal 120.

In the present context, switching from a first satellite beam 115 to a second satellite beam 115 means (i) deactivating a first satellite link established via the first beam 115 and establishing a second satellite link via the second beam 115, or (ii) activating the second satellite link while maintaining the first satellite link. In the present context, "activating" or "deactivating" a satellite link may include configuring one or more terminal 120 components such as an antenna, a modulator, demodulator, encoder, and/or decoder to communicate or disable an existing communication via the respective satellite link, e.g., communicating based on a specified frequency, polarization, symbol rate specific to the satellite link. Switching from a first beam 115 to a second beam 115 is typically performed electronically, i.e., without any physical change to an orientation of the dish and/or the antenna (e.g., by actuating a phased array antenna, as discussed below). In some examples, switching from a first beam 115 to a second beam 115 may be performed by actuating a motor mechanically coupled to a terminal 120 dish based on a location of the satellite 110.

A satellite gateway 190 is a device including a computer that is programmed to communicate with terminal(s) 120 via satellite(s) 110. A gateway computer typically provides communication between a satellite network 100 and another communication network, e.g., Internet. A satellite gateway 190 may be connected to a traffic gateway via an IP (Internet Protocol) communication interface and/or any other suitable wired or wireless communication interface. In some examples, the CBS computer 170 may be included in a satellite gateway 190.

With respect to FIG. 1, the CBS computer 170 can be programmed to receive location data of satellite terminals 120, and to select, based on the received location data, for each of the satellite terminals 120, a respective satellite 110 beam 115 for providing satellite communications. The CBS computer 170 can be programmed to broadcast a message to the satellite terminals 120 including data specifying selected satellite 110 beams 115 for respective satellite terminals 120.

In the present context, "location data" received from satellite terminals 120 includes at least location coordinates of the terminal 120, e.g., longitude and latitude coordinates with respect to a reference coordinate system such as GPS (global positioning system). Table 1 shows an example set of terminal location data specifying various type of data that may be included in the location data transmitted by satellite terminals 120 and received by the CBS computer 170.

TABLE 1

| Parameter | Description |
|---|---|
| Terminal identifier | An identifier (e.g., a number) specific to a terminal. |
| Location coordinates | Coordinates with respect to a reference location coordinates system |
| Current beam | Identifier of a satellite beam through which terminal currently communicates with a satellite. Additionally, data may include an identifier of a channel being used for communication. |
| Speed | Speed of terminal 120 movement, e.g., specified in kilometers per hour (kph). |
| Direction of movement | A direction of movement on the ground surface, e.g., using a vector or heading defined with respect to the location coordinates system. |
| Data load | Data bandwidth requested by terminal to operate based on an actual use of terminal, e.g., video playback, phone call, etc. |

The CBS computer 170 may be programmed to select one or more satellite 110 beams 115 for a satellite terminal 120 based on a current location of the terminal 120. The computer 170 may be programmed to select a satellite beam 115 based on the footprints 160 stored in the CBS computer 170 and the location of the terminal 120. In one example, the CBS computer 170 selects a beam 115 for a satellite terminal 120 upon determining that the terminal 120 is located within boundaries of the footprint 160 of the respective beam 115. As discussed above, the footprint 160 is specified by data specifying boundaries of the footprint 160 and is different from a transmission region 150 of the satellite beam 115. Thus, by changing data specifying boundaries of a footprint 160, the computer 170 may select a different beam 115 for the terminal 120 at the received location, although the transmission region 150 of the respective beam 115 may be unchanged, as discussed below with respect to Table 3.

The CBS computer 170 may receive location data including speed, a direction of movement, an identifier of a current beam 115 through which the terminal 120 communicates with a satellite gateway 190, and/or channel(s) which the terminal 120 uses for communication. As discussed below, the computer 170 may select the beam 115 for a terminal 120 based on various combinations data such as speed, the direction of movement, etc., included in the received location data.

In one example, the computer 170 may be programmed, upon determining based on a terminal 120 speed and direction of movement that the terminal 120 is (i) within an overlap area of a first footprint 160 and a second footprint 160 and (ii) moving away from a first footprint 160 toward a second footprint 160, to select a beam 115 of the second footprint 160 for the terminal 120. For example, upon determining based on speed and/or direction of movement that a time left before the terminal 120 exists the overlap area while being in the second footprint 160, is less than a threshold, e.g., 5 minutes, the computer 170 may select the second footprint 160.

A beam plan specifies a set of footprints 160 for one or more satellite beams 115. Different beam plans typically specify a different set of footprints 160 for the coverage area 130 of the satellite network 100. The computer 170 may store any number of beam plans and/or receive the beam plans data from a remote computer. Table 2 shows a set of example beam plans, including two beam plans that each include four footprints 160. Parameter $bd_{ij}$ specifies boundary data of a footprint j of a beam plan i. Parameter $B_i$ identifies an identifier of a beam 115. A beam 115 identifier may include numerical data specifying a satellite 110 and a beam 115 of the satellite, e.g., first beam of second satellite 110 of the network 100.

TABLE 2

| Beam plan identifier | Footprint index | Boundary data | Beam identifier | Rating |
|---|---|---|---|---|
| 1 | 1 | $bd_{11}$ | $B_1$ | 2 |
| 1 | 2 | $bd_{12}$ | $B_2$ | 3 |
| 1 | 3 | $bd_{13}$ | $B_3$ | 5 |
| 1 | 4 | $bd_{14}$ | $B_4$ | 1 |
| 2 | 1 | $bd_{21}$ | $B_1$ | 4 |
| 2 | 2 | $bd_{22}$ | $B_2$ | 2 |
| 2 | 3 | $bd_{23}$ | $B_3$ | 4 |
| 2 | 4 | $bd_{24}$ | $B_4$ | 3 |

Figure 2:
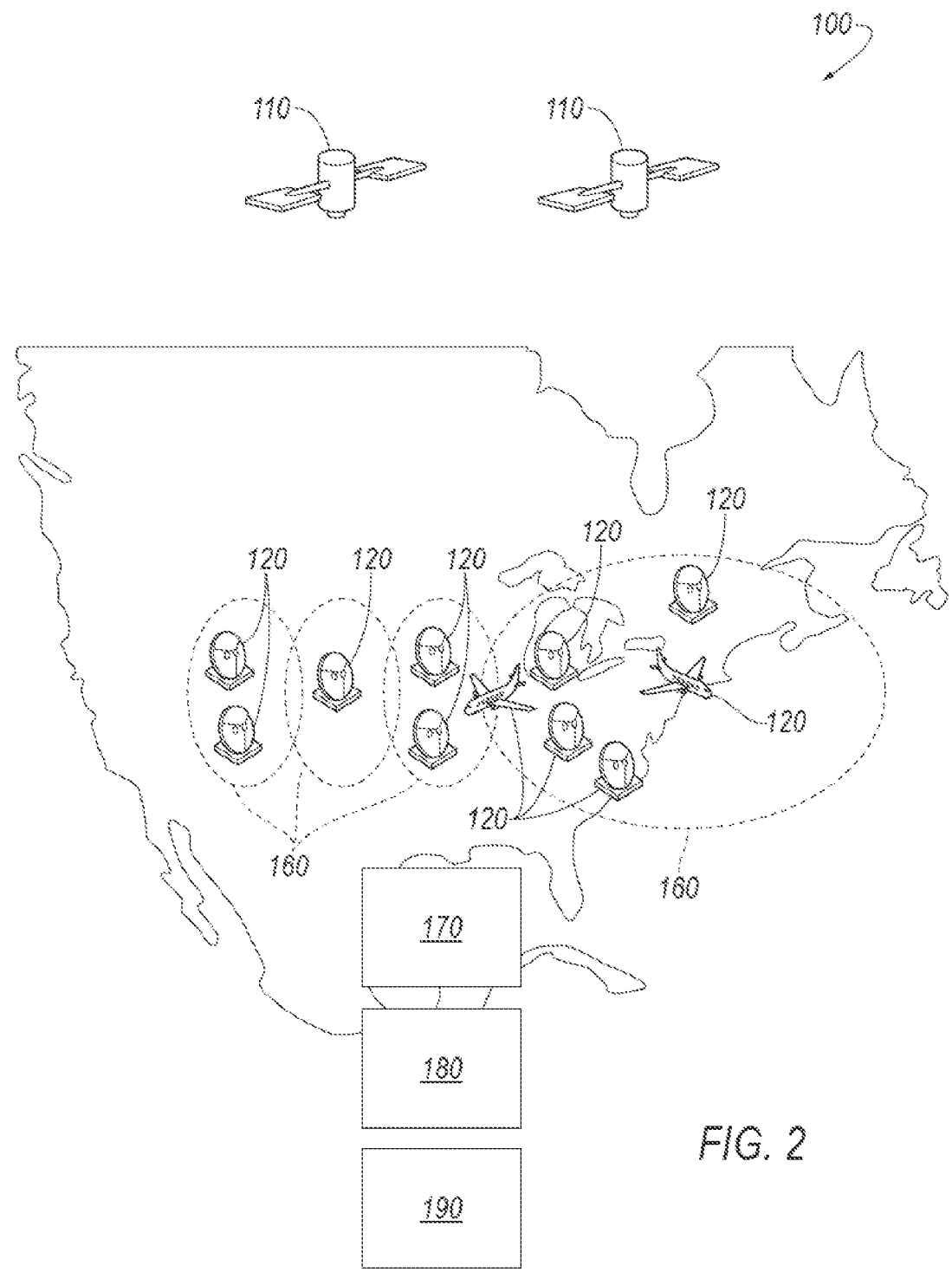
FIG. 2 illustrates an example beam plan.
Figure 3:
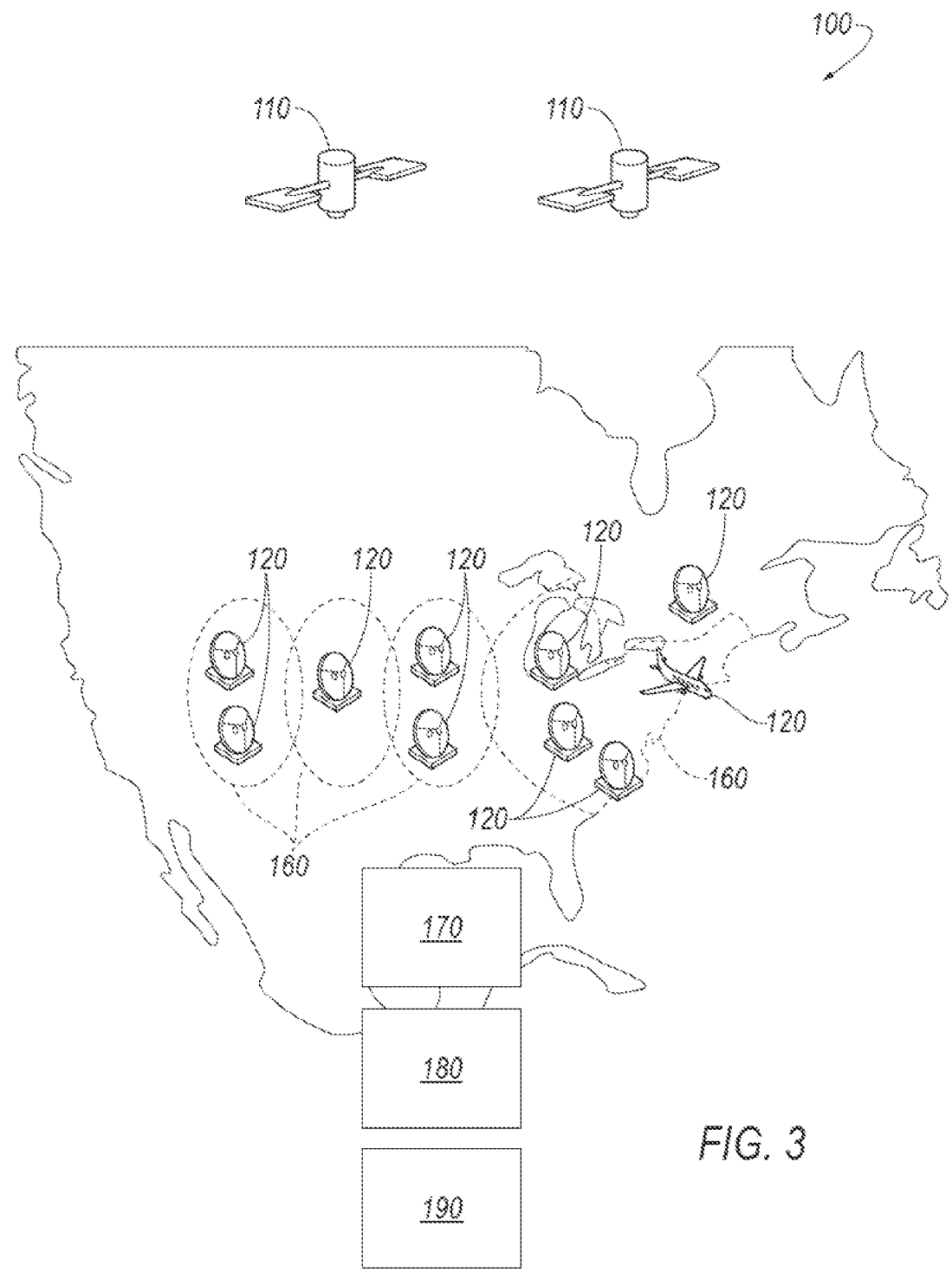
FIG. 3 illustrates another example beam plan.

FIG. 2 shows a first beam plan (e.g., specified by the first 4 rows on Table 2), and FIG. 3 shows a second beam plan (e.g., specified by the last 4 rows of Table 2). For example, beam footprints 160 of FIG. 3 are defined differently from the beam footprints 160 of FIG. 2. In FIG. 3, the footprints 160 are defined such that a footprint 160 is within a country. For example, footprints 160 of FIG. 3 are within the United States, whereas the footprints 160 of FIG. 2 are partially in Mexico or Canada. The CBS computer 170 may be programmed to select a beam 115 for a terminal 120 based on a selected beam plan, e.g., a first beam plan as shown in FIG. 2. A footprint 170 may be adjusted by changing its location, dimensions, and/or shape. For example, the stored boundary data $bd_{13}$ may be changed to make a footprint 160 smaller, e.g., to avoid a detected unstable communication near its current boundary area. Thus, the computer 170 may store updated boundary location data $bd_{13}$ replacing previously stored data.

As discussed above, footprints 160 may overlap. Thus, the computer 170 may be programmed to select a beam 115 for a terminal 120 located in the overlap area of the footprints 160. In one example, the stored beam plan includes a rating of footprints 160. As shown in Table 2, stored beam plan may store a respective rating for footprint(s) 160. A rating is a quantifier, e.g., a number between 1 (least preferred footprint) and 5 (most preferred footprint). A rating of a beam 115 may be determined based on user input. Additionally or alternatively, a rating of a beam 115 may be determined based on beam 115 bandwidth, reliability, etc. Additionally or alternatively, a rating may include an ordered list of criteria to follow (for example, loading first, then numeric weight and then reliability). Additionally or alternatively, a rating may include a weighted list, e.g., 50% weight for normalized loading, 40% for normalized weight, and 10% for reliability. Additionally or alternatively, rating may be determined based on terminals 120 to use a first beam 115 for a first group of terminals 120 and a second beam 115 for a second group of terminals 120. Upon determining that the terminal 120 is in an overlap area of the first and second footprint 160, the CBS computer 170 may be programmed to select the first footprint 160 upon determining that the rating of the first footprint 160 is greater than the rating of the second footprint 160.

Upon selecting a beam 115 for a terminal 120, the CBS computer 170 may be programmed to send a message including an identifier of the terminal 120 and a beam identifier $B_i$. A terminal 120 identifier can include a terminal 120 location. As discussed below, the terminal 120 may be programmed to maintain or switch beam 115 through which the terminal 120 communicates upon receiving the message from the CBS computer 170 via satellite communication. In some example, the CBS computer 170 may select multiple beams 115 for a terminal 120. For example, upon determining that a terminal 120 is in an overlap area, the CBS computer 170 may identify the beams 115 which provide the overlapping footprints 160. Thus, the message sent to the terminal 120 may include multiple beam identifiers $B_i$. As discussed below, the terminal 120 computer 140 may be programmed to select one of the beams 115 based on the received identifiers $B_i$.

With respect to FIGS. 2 and 3, the CBS computer 170 may receive location data from multiple terminals 120. In one example, instead of sending individual messages to terminals 120, the CBS computer 170 may be programmed to broadcast a message including terminal identifiers and respective beams for multiple terminals 120.

Table 3 shows an example set of data for n terminals 120 included in the message. $T_1 \ldots T_n$ are identifiers of n terminals 120 receiving data from the computer 170. $SB_1 \ldots SB_n$ are selected beam identifiers $B_i$ for each of the terminals 120. As discussed above, the computer 170 may, in some examples, select multiple beams for a terminal 120. Thus, a line of Table 3 may include multiple selected beams 115 for a terminals 120.

TABLE 3

| Terminal identifier | Beam identifier(s) |
|---|---|
| $T_1$ | $SB_1$ |
| ... | ... |
| $T_n$ | $SB_n$ |

With respect to the example of Table 3, each of the terminals 120 identified by $T_1 \ldots T_n$ may be currently communicating via a same beam 115. The computer 170 may be programmed to broadcast the message via a satellite beam 115 upon determining, based on the received location data, that each of the satellite terminals 120 currently communicate via the same satellite beam 115. In other words, the message sent via the beam 115 that currently provides communication to the terminals 120 can reach the terminals 120 through broadcast via one single beam 115. Thus, the satellite may transmit via multiple beams 115, e.g., 10 beams 115, but the computer 170 may actuate the satellite 110 antenna to send the message via a first beam 115 of the satellite 110.

In another example, the computer 170 may be programmed to receive location data from multiple satellite terminals 120 and to determine a first set of terminals 120 currently communicating via a first beam 115 and a second set of terminals 120 currently communicating via a second beam 115. The compute 170 may be programmed to broadcast a first message via the first beam 115 including identifiers of first set of terminals 120 and respective selected beams 115, and a second message to the second beam 115 including identifiers of the second set of terminal 120 and respective selected beams 115. In yet another example, the computer 170 may be programmed to send a message to both first and second beams 115 including identifiers of the first and second set of terminals 120 and respective selected beams 115.

As discussed above, a beam 115 typically includes multiple communication channels. The computer 170 may be programmed to broadcast a message via respective channels of a beam 115. In another example, the computer 170 may be programmed to broadcast the message via a subset of channels selected based on the respective channel of communication of each of the terminals 120. For example, upon determining that terminals 120 communicate via 3 specific channels of a beam 115, the computer 170 may be programmed to broadcast the message including identifiers of selected beams 115 for the terminals 120 via the specific channels.

Figure 4:
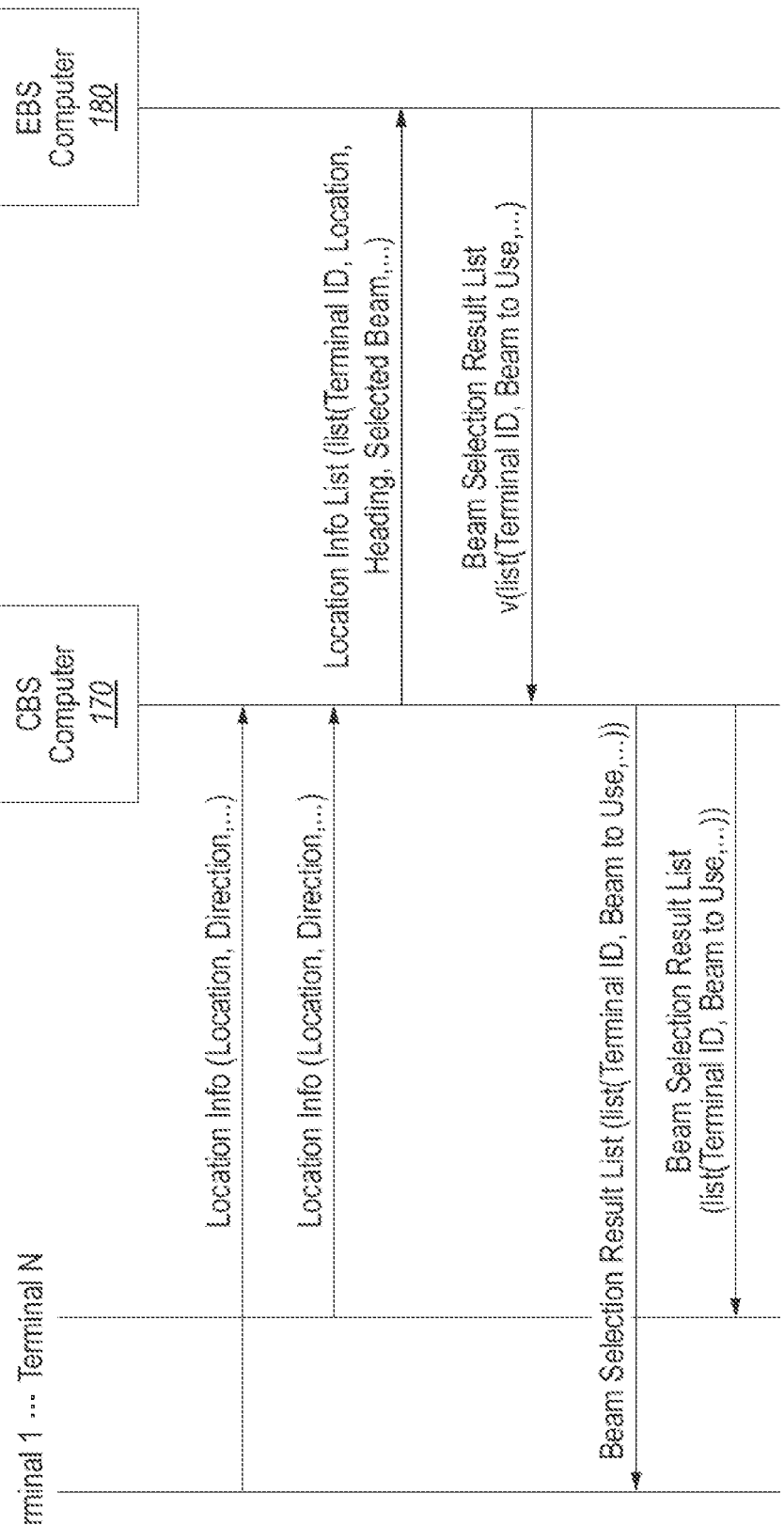
FIG. 4 is an example diagram showing interactions of terminals, CBS computer, and an External Beam Selector (EBS) computer.

In some examples, as illustrated by the diagram 400 shown in FIG. 4, the computer 170 may be programmed to transmit, to a second remote computer 180, identifiers of the satellite terminals 120 and the selected respective satellite beams 115 identifiers, and upon receiving data from the second remote computer 180, to broadcast the message to the satellite terminals 120 based on the received data. Additionally, the computer 170 may be programmed to transmit, to the EBS computer 180, a speed, direction, elevation, current loading of beams, current data load of the terminals 120. As shown in the diagram 400, the EBS computer 180 may respond to the CBS computer 170 by providing a selection of beams 115 to use by the respective terminals 120. Thus, the EBS computer 180 may confirm the beam 115 selected by the CBS computer 170 by providing the same selected beam 115 for a terminal 120 or propose a different beam 115 or beams 115 for the terminal 120. As shown in FIG. 4, the CBS computer 170 may send a message including the terminals 120 data to the EBS computer 180. As another example (not shown), the CBS computer 170 may be programmed to send individual messages to the EBS computer 180, e.g., each message including data of a terminal 120.

A terminal 120 computer 140 can be programmed, upon receiving the broadcast message from the CBS computer 170, based on message data, to determine whether an instruction for the satellite terminal 120 is included in the message, and, upon determining that the instruction for the satellite terminal 120 is included in the message, then switch the satellite terminal 120 based on one or more beam identifiers $B_i$ included in the message.

The terminal 120 computer 140 may be programmed to determine that an instruction for the terminals 120 is included in a message broadcast from the CBS computer 170 upon determining that the terminal 120 identifier is included in the list of identifiers in the message, as discussed with respect to Table 3.

The satellite terminal 120 computer 140 may be programmed to maintain a current satellite beam 115 through which the satellite terminal 120 communicates upon determining that an identifier of the current satellite beam 115 is included in the received one or more beam identifiers $B_i$. In other words, if the CBS computer 170 sends an instruction for the terminal 120 to switch to a beam 115 through which the terminal 120 currently communicates, then no switching of the beam 115 is needed.

The satellite terminal 120 computer 140 may be programmed to switch from a current satellite beam 115 to one of the beams 115 identified by the received message upon determining that the received beam identifiers $B_i$ lacks an identifier of the current satellite beam 115. In other words, if the received instruction for the terminals 120 includes a list of beams 115 for the terminal 120 in which the current beam 115, through which the terminal communicates, is not listed, then the terminals 120 computer 140 actuates the terminal 120 to switch to one of the selected beams 115.

In case multiple beam identifiers $B_i$ are included in the received message for the terminal 120, then the terminal 120 computer 140 may be programmed to select one of the beams 115 identified by the identifiers $B_i$ based on stored criteria, e.g., based on a load of the one or more satellite beams. For example, the computer 140 may be programmed to select one of the beams 115 with a minimum load. Load, in the present context, is a volume of data communicated (transmitting and receiving) by satellite beam 115, e.g., specified in Mega symbols per second (Msps), Giga symbols per second (Gsps), or any other applicable unit. In another example, the terminal 120 computer 140 may be programmed to determine a necessary bandwidth for the terminal 120, e.g., based on a current use of the terminal 120 such as a streaming video, etc., and then based on available bandwidth of selected beams 115, to select a beam 115 which can provide the requested bandwidth.

Figure 5:
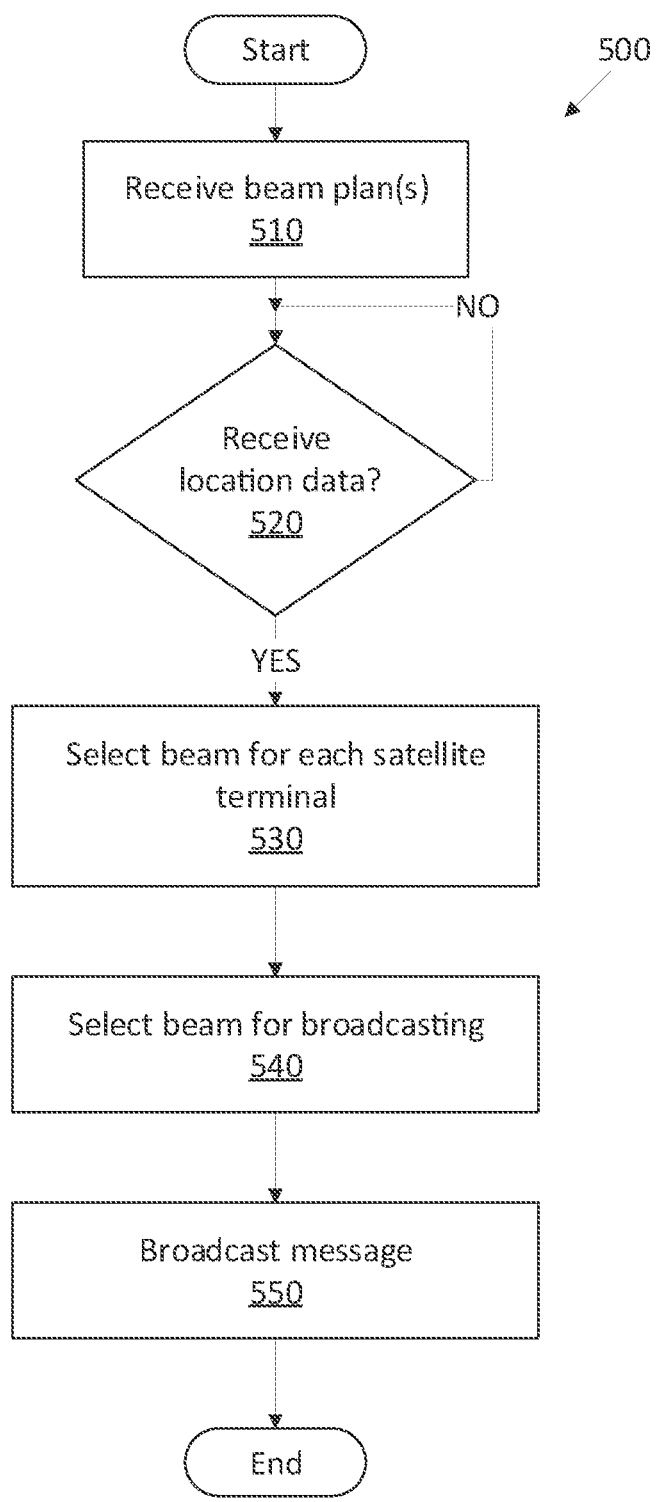
FIG. 5 is an example flowchart of a process for operating a Central Beam Selector (CBS) computer.

FIG. 5 is a flowchart of exemplary process 500 for operating a CBS computer 170. The CBS computer 170 may be programmed to execute blocks of the process 500.

The process 500 begins in a block 510, in which the CBS computer 170 receives beam plan(s), e.g., stored in a computer 170 memory. Beam plan(s) may be input to the CBS computer 170 by an operator. Additionally or alternatively, beam plan(s) may be autogenerated by a suitable software tool and input to the CBS computer 170 via a computer 170 interface. In one example, the computer 170 may store multiple beams plans, e.g., as shown in example Table 2.

Next, in a decision block 520, the CBS computer 170 determines whether location data is received from one or more terminals 120. The location data may include data such as shown in Table 1. If the CBS computer 170 determines that location data from terminal(s) 120 is received, then the process 500 proceeds to a block 530; otherwise the process 500 returns to the decision block 520.

In the block 530, the CBS computer 170 selects one or more beams 115 for each of the terminals 120, from which location data was received. The computer 170 may be programmed to select the beam 115 based on the location of a terminal 120 and the stored beam plans.

Next, in a block 540, the computer 170 selects beams 115 through which the message is broadcast. In one example, upon determining each of the terminals 120 receiving instruction are communicating via a current beam 115, the computer 170 may broadcast the message via the current beam 115. In another example, the computer 170 may be programmed to broadcast multiple messages via different beams 115 based on the locations of the terminals 120 and the beams 115 through which the terminals 120 communicate. Additionally, the computer 170 may be programmed to broadcast via a selected subset of channels of a beam 115, channels selected based on determining through which channels the terminals 120 currently communicate.

Next, in a block 550, the computer 170 broadcasts the message including identifiers of terminals 120 and identifiers of the selected respective beams 115 for each terminal 120, e.g., as shown in example Table 3.

Following the block 550, the process 500 ends, or alternatively returns to the block 510, although not shown in FIG. 5.

Figure 6:
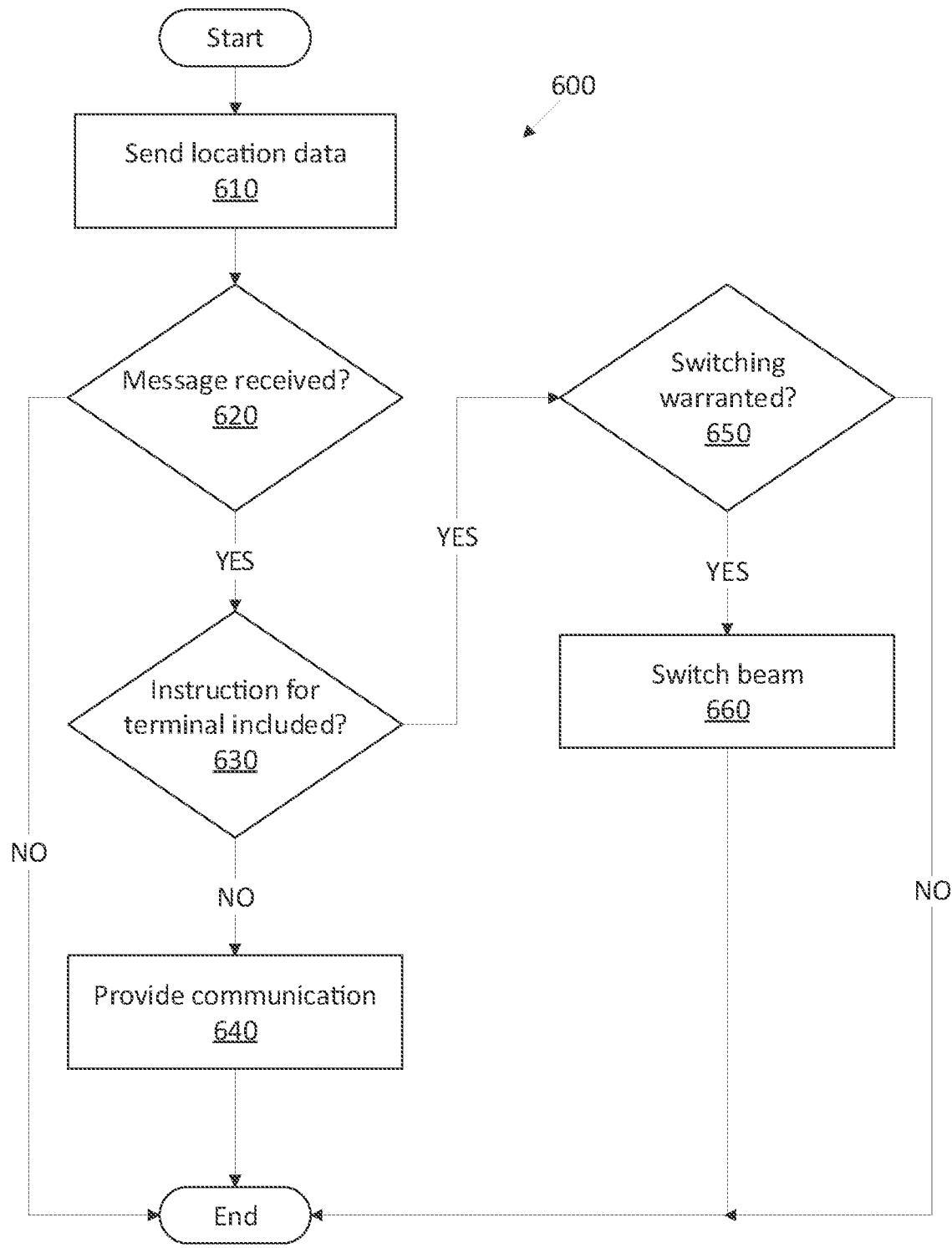
FIG. 6 is an example flowchart of a process for operating a satellite terminal.

FIG. 6 is a flowchart of exemplary process 600 for operating a terminal 120 computer 140. The terminal 120 computer 140 may be programmed to execute blocks of the process 600.

The process 600 begins in a block 610, in which the terminal 120 computer 140 sends terminal 120 location data to the CBS computer 170 via an uplink. The computer 140 may be programmed to determine location data, e.g., as shown in example Table 1, based on data received from a sensor included in the terminal 120. For example, the computer 140 may receive from the terminal 120 its location, speed, and/or direction of movement data from a GPS sensor or the like included in the terminal 120. Data sent by the terminal 120 further includes an identifier of the terminal 120.

Next, in a decision block 620, the computer 140 determine whether a message is received from the CBS computer 170. If the computer 140 determines that a message, e.g., as shown in example Table 3, is received, then the process 600 proceeds to a decision block 630; otherwise the process 600 ends, or alternatively proceeds to a block 640, although not shown in FIG. 6.

In the decision block 630, the computer 140 determines whether an identifier of the terminal 120 is included in the received message. The computer 140 determines that the terminal 120 is identified in the received message upon determining that an identifier of the terminal 120 is included in the list of terminal identifiers included in the message. If the computer 140 determines that the terminal 120 is identified in the received message, then the process 600 proceeds to a decision block 650; otherwise the process 600 proceeds to the block 640.

In the block 640, the computer 140 operates the terminal 120 to provide communication, e.g., downloading or uploading audio data, performing a phone call, etc.

In the decision bock 650, the computer 140 determines whether switching of a beam 115 through which the terminal 120 communicates is warranted. The computer 140 determines that switching of a beam 115 is warranted upon determining that a current beam 115 of the terminal 120 is not included in the received set of one or more selected beams 115. If the computer 140 determines that the switching is warranted, the process 600 proceeds to a block 660; otherwise the process 600 ends, or alternatively proceeds to the block 640, although not shown in FIG. 6.

In the block 660, the computer 140 switches from a terminal 120 current beam 115 to the beam 115 selected by the CBS computer 170. Following the block 660, the process ends, or alternatively, returns to the block 610.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, network devices such as a gateway or terminal, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A system comprising a remote computer including a processor and a memory, the memory storing instructions executable by the processor to:
   receive location data of a plurality of satellite terminals;
   select, based on the received location data, for each of the plurality of satellite terminals, a respective satellite beam for providing satellite communications; and
   broadcast a message to the plurality of satellite terminals including data specifying respective selected satellite beams for each of the plurality of satellite terminals,
   wherein the message includes (i) terminal identifiers of the plurality of satellite terminals, and (ii) one or more satellite beam identifiers, and
   wherein the received location data for a terminal further includes a satellite beam identifier specifying at least one of a speed and a direction of movement of the selected terminal, and the instructions further include instructions to select the satellite beam for the terminal based at least in part on a speed, direction of movement of the satellite terminal, or requested data load of the terminal.

2. The system of claim 1, wherein the instructions further include instructions to select the respective satellite beams from one or more stored beam plans, wherein each of the one or more stored beam plans specifies a respective set of footprint boundaries for one or more satellite beams.

3. The system of claim 2, wherein each of the footprint boundaries is a subset of a transmission region of a satellite antenna.

4. The system of claim 2, wherein the one or more stored beam plans further specify a rating for each beam, wherein the instructions further include instructions to select the respective satellite beam based at least in part on the rating of the respective satellite beam.

5. The system of claim 1, wherein the instructions further include instructions to broadcast the message via a satellite beam upon determining, based on the received location data, that each of the plurality of satellite terminals communicate via the satellite beam.

6. The system of claim 1, wherein the received location data further includes a satellite beam identifier specifying current satellite beams through which respective satellite terminals communicate, and the instructions further include instructions to determine, based on the current satellite beams, that each of the plurality of satellite terminals communicate via the satellite beam.

7. The system of claim 1, wherein the instructions further include instructions to broadcast the message via each of a plurality of channels of the selected beam.

8. The system of claim 1, wherein the instructions further include instructions to broadcast the message via a subset that is less than all of a plurality of channels of the selected beam, wherein the subset of the plurality of channels is selected based on respective channel of communication of each of the plurality of terminals.

9. The system of claim 1, wherein the instructions further include instructions to:
   transmit, to a second remote computer, identifiers of the satellite terminals and the selected respective satellite beams identifiers; and
   upon receiving data from the second remote computer including at least one of a confirmation of the transmitted identifiers or new proposed satellite beams, broadcast the message to the satellite terminals based on the received data.

10. The system of claim 9, wherein the instructions further include instructions to transmit, to the second computer, a speed, direction, elevation, current loading of beams, or current data load of the terminals.

11. The system of claim 1,
further comprising a satellite terminal computer, programmed to:
upon receiving receive the broadcast message, based on message data, determine whether an instruction for the satellite terminal is included in the message; and
upon determining that the instruction for the satellite terminal is included in the message, then switch the satellite terminal based on one or more beam identifiers included in the received message data.

12. The system of claim 11, wherein the satellite terminal computer is further programmed to maintain a current satellite beam through which the satellite terminal communicates upon determining that an identifier of the current satellite beam is included in the received one or more beam identifiers.

13. The system of claim 11, wherein the satellite terminal computer is further programmed to switch from a current satellite beam through which the satellite terminal communicates to one of the one or more beam identifiers included in the received message data upon determining that the received one or more beam identifiers lacks an identifier of the current satellite beam.

14. The system of claim 13, wherein the satellite terminal computer is further programed to select one of the one or more beam identifiers based on a load of the one or more satellite beams.

15. A system comprising a remote computer including a processor and a memory, the memory storing instructions executable by the processor to:
receive location data of a plurality of satellite terminals;
select, based on the received location data, for each of the plurality of satellite terminals, a respective satellite beam for providing satellite communications; and
broadcast a message to the plurality of satellite terminals including data specifying respective selected satellite beams for each of the plurality of satellite terminals,
wherein the message includes (i) terminal identifiers of the plurality of satellite terminals, and (ii) one or more satellite beam identifiers, and
wherein the instructions further include instructions to broadcast the message via a first satellite beam and a second satellite beam upon determining, based on the received location data, that a first subset of the plurality of satellite terminals communicate via the first satellite beam and a second subset of the plurality of satellite terminals communicate via the second satellite beam.

16. A system comprising a remote computer including a processor and a memory, the memory storing instructions executable by the processor to:
receive location data of a plurality of satellite terminals;
select, based on the received location data, for each of the plurality of satellite terminals, a respective satellite beam for providing satellite communications; and
broadcast a message to the plurality of satellite terminals including data specifying respective selected satellite beams for each of the plurality of satellite terminals,
wherein the instructions further include instructions to:
transmit, to a second remote computer, identifiers of the satellite terminals and the selected respective satellite beams identifiers; and
upon receiving data from the second remote computer including at least one of a confirmation of the transmitted identifiers or new proposed satellite beams, broadcast the message to the satellite terminals based on the received data.

17. The system of claim 16, wherein the instructions further include instructions to transmit, to the second computer, a speed, direction, elevation, current loading of beams, or current data load of the terminals.

18. A system comprising a remote computer including a processor and a memory, the memory storing instructions executable by the processor to:
receive location data of a plurality of satellite terminals;
select, based on the received location data, for each of the plurality of satellite terminals, a respective satellite beam for providing satellite communications; and
broadcast a message to the plurality of satellite terminals including data specifying respective selected satellite beams for each of the plurality of satellite terminals,
further comprising a satellite terminal computer, programmed to:
upon receiving the broadcast message, based on message data, determine whether an instruction for the satellite terminal is included in the message; and
upon determining that the instruction for the satellite terminal is included in the message, then switch the satellite terminal based on one or more beam identifiers included in the received message data.

19. The system of claim 18, wherein the satellite terminal computer is further programmed to maintain a current satellite beam through which the satellite terminal communicates upon determining that an identifier of the current satellite beam is included in the received one or more beam identifiers.

20. The system of claim 18, wherein the satellite terminal computer is further programmed to switch from a current satellite beam through which the satellite terminal communicates to one of the one or more beam identifiers included in the received message data upon determining that the received one or more beam identifiers lacks an identifier of the current satellite beam.

21. The system of claim 20, wherein the satellite terminal computer is further programed to select one of the one or more beam identifiers based on a load of the one or more satellite beams.

* * * * *

UNITED STATES PATENT AND TRADEMARK OFFICE
CERTIFICATE OF CORRECTION

| | |
|---|---|
| PATENT NO. | : 11,616,566 B2 |
| APPLICATION NO. | : 17/137877 |
| DATED | : March 28, 2023 |
| INVENTOR(S) | : Rajeev Gautam Oza, Suresh Kumar Korada and Guy Montgomery |

It is certified that error appears in the above-identified patent and that said Letters Patent is hereby corrected as shown below:

In the Claims

Column 15, in Line 4, Claim 11, replace "upon receiving receive the broadcast message" with -- upon receiving the broadcast message --.

Signed and Sealed this
Second Day of May, 2023

Katherine Kelly Vidal
*Director of the United States Patent and Trademark Office*